United States Patent [19]

Altman et al.

[11] Patent Number: 4,961,899

[45] Date of Patent: Oct. 9, 1990

[54] MULTIPLE-CABLE CONNECTING DEVICE FOR A NUCLEAR REACTOR

[75] Inventors: Denis J. Altman, Jeannette; John S. Urban, Pitcairn, both of Pa.

[73] Assignee: Westinghouse Electric Corp., Pittsburgh, Pa.

[21] Appl. No.: 465,562

[22] Filed: Jan. 16, 1990

Related U.S. Application Data

[63] Continuation of Ser. No. 643,510, Aug. 23, 1984, abandoned.

[51] Int. Cl.$^5$ .............................................. G21C 19/00
[52] U.S. Cl. .................................... 376/260; 439/376
[58] Field of Search .............. 376/260, 262, 263, 205, 376/463; 439/263, 264, 310, 374, 376

[56] References Cited

U.S. PATENT DOCUMENTS

| | | | |
|---|---|---|---|
| 3,453,586 | 7/1969 | Brendlen, Jr. | 439/153 |
| 3,488,624 | 1/1970 | Kastning et al. | 439/263 |
| 3,750,086 | 7/1973 | Iverson | 439/264 |
| 3,836,429 | 9/1974 | Frisch et al. | 376/263 |
| 3,836,430 | 9/1974 | Frisch et al. | 376/263 |
| 3,851,906 | 12/1974 | Frisch et al. | 376/463 |
| 4,062,610 | 12/1977 | Doty et al. | 439/264 |
| 4,158,599 | 6/1979 | Andrews et al. | 376/262 |
| 4,179,171 | 12/1979 | Shannon | 439/189 |
| 4,257,717 | 3/1981 | Ege | 376/260 |
| 4,288,292 | 9/1981 | Hardin, Jr. et al. | 376/260 |
| 4,302,290 | 11/1981 | Mazur et al. | 376/260 |

FOREIGN PATENT DOCUMENTS

| | | |
|---|---|---|
| 1087430 | 10/1967 | United Kingdom . |
| 1112457 | 5/1968 | United Kingdom . |
| 1308247 | 2/1973 | United Kingdom . |
| 1382797 | 2/1975 | United Kingdom ................ 376/269 |
| 1558829 | 1/1980 | United Kingdom . |
| 2013979 | 4/1982 | United Kingdom . |
| 2100496 | 12/1982 | United Kingdom ................ 376/260 |

OTHER PUBLICATIONS

"Rapid Refueling System for Nuclear Plants", Andrews et al., *Westinghouse Engr.*, vol. 34, No. 2, pp. 53-59, 4/74.

Primary Examiner—Daniel D. Wasil
Attorney, Agent, or Firm—D. C. Abeles

[57] ABSTRACT

A device in a nuclear reactor for connecting a plurality of energy conveying cables to a nuclear reactor head structure comprising a pair of matching multiple cooperative connector plates for disengageably connecting an energy source with the reactor head structure; at least one of said connector plates being a movable connector plate; each of the multiple connector plates containing a multiplicity of individual connectors, each individual connector being one of a matching pair of connectors that are engaged when the matching multiple connector plates are brought together, each connector of the matching pair being mounted in corresponding locations on the opposing matching multiple connector plates; and at least one displacing means, affixed to a support structure on one end and to said movable connector plate at the other end, for accurately guiding the movable connector plate along a precise, predetermined path, such that the connectors of each pair of matching connectors meet in correct alignment.

13 Claims, 2 Drawing Sheets

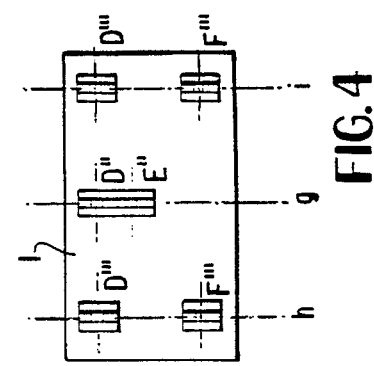
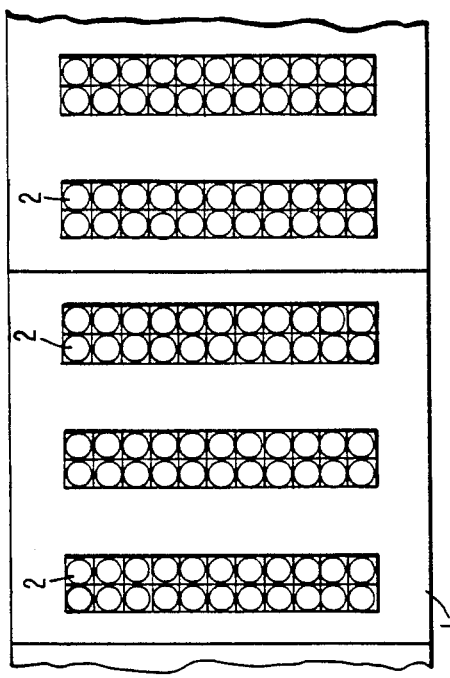
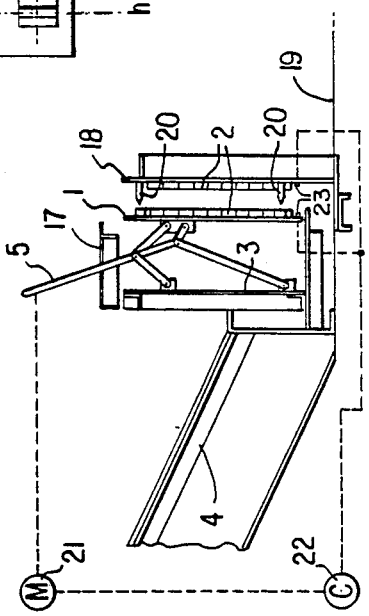
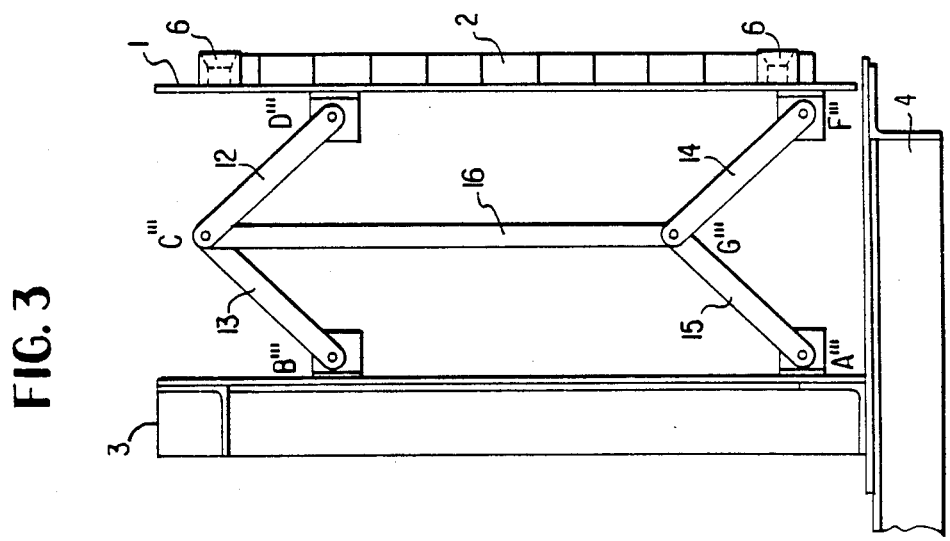

MULTIPLE-CABLE CONNECTING DEVICE FOR A NUCLEAR REACTOR

This application is a continuation of application Ser. No. 06/643,510 filed Aug. 23, 1984, now abandoned.

BACKGROUND OF THE INVENTION

This invention relates to nuclear reactors generally, and, in particular, concerns multi-cable connecting devices to be used with nuclear reactors for coupling and uncoupling a large number of reactor head cables.

Nuclear reactors have a multitude of electrical lines connected to the reactor head structure to supply power to control rod drive mechanisms, displacer rod drive mechanisms, rod position indicators and other instruments.

When the reactor head is to be disconnected or removed for maintenance or refueling, the many electrical cables associated with a reactor head must be disconnected and moved aside so that the reactor head may be opened. With advanced pressurized water reactors, for example, the various power and instrumentation cables may number from 300 to 500 for an individual reactor. If the reactor is to be opened, each one of these cables must be disconnected and later reconnected by maintenance personnel. It is imperative during these operations that the duration of the workers' exposure to radiation, which may be relatively high at the periphery of the reactor head, be as short as possible. There is the significant possibility that while the cables are hastily being reconnected they can become damaged, resulting in longer down time, additional maintenance costs, and greater worker exposure. Reactor down time is doubly costly because while the reactor is not operating replacement power must be purchased.

As the coupling and uncoupling of the hundreds of electrical connections is performed quickly, it is possible for a worker to mistakenly attempt to connect the wrong cable to a particular receptacle. Although each connection is keyed, there are a great number of cables and an incorrect connection is not impossible; at the very least, the cable plug or the receptacle may be damaged.

Reactors and their associated equipment have in some cases been designed for the purpose of reducing reactor down time during refueling. For example, a rapid refueling concept is disclosed in U.S. Pat. Nos. 3,836,429 and 3,836,430, issued to Frisch and Andrews on Sept. 17, 1974. According to these prior art concepts, the electrical cables were mounted on a movable support structure, or bridge, and were provided with sufficient cable lengths to be moved aside with the reactor head structure, allowing access to the reactor internals. The use of long cables that remain connected was necessary with the rapid refueling concept because certain systems associated with the reactor head, e.g., mechanisms for retaining the control rods, were kept active during the refueling process. However, the lengthy cables and movable supports associated with the rapid refueling system are cumbersome and require a particular design for the reactor head and its associated equipment. They also require a particular design for the containment area and cannot be retrofit into existing plants.

SUMMARY OF THE INVENTION

It is an object of the invention to provide a multi-cable connecting and disconnecting arrangement which helps to reduce worker radiation exposure, shorten down time, and to obviate connector-damaging mistakes.

This object and others to become apparent as the specification progresses are accomplished by the invention, which comprises, briefly stated, a device in a nuclear reactor for connecting a plurality of energy conveying cables to a nuclear reactor head structure comprising a pair of matching multiple cooperative connector plates for disengageably connecting an energy source with the reactor head structure; at least one of said connector plates being a movable connector plate; each of the multiple connector plates containing a multiplicity of individual connectors, each individual connector being one of a matching pair of connectors that are engaged when the matching multiple connector plates are brought together, each connector of the matching pair being mounted in corresponding locations on the opposing matching multiple connector plates; and a displacing means, affixed to a support structure on one end and to said movable connector plate at the other end, for accurately guiding the movable connector plate along a precise, predetermined path, such that the connectors of each pair of matching connectors meet in correct alignment.

According to a preferred embodiment of this invention, linkages are used with the movable plate that provide parallel rectilinear motion, i.e., pure translational motion. These linkages, for example a "Kemp's linkage", maintain the plate on a path of parallel rectilinear motion such that its movement after disengaging from the stationary plate is in a single dimension. Such a linkage prevents the occurrence of, for example, an arcuate movement found with other types of linkages that may result in damage to the individual connectors on the plates, particularly when pin-type connectors are used.

Preferably, the plates are match drilled prior to assembly to obviate misalignment. The plates may contain a multiplicity of individual connectors or connectors specifically developed for mass connections containing a large number of individual connections, e.g., pins, within each individual connector. In addition, keying and aligning means may be provided to aid in aligning the matched plates as they are brought together. Such an arrangement is particularly advantageous with plates containing a large number of small connectors that can be easily damaged if misaligned, such as those for instrumentation and control cables. Examples of aligning means are conical or wedge shaped tapered pins. The connector pins themselves may also serve as aligning means if they are tapered pins.

All reactor head connections may conceivably be made using a single pair of matched plates. However, in many cases it will be more practical and convenient to use several matched plates according to the invention to connect particular groups of lines selected according to function or location. In particular, it may be advantageous to connect and disconnect particular systems in a predetermined order, thus, groups of cables which are to be coupled and uncoupled at the same time may be included in the same matching plates.

It is also within the concept of the invention to include the connecting of non-electrical lines using the same connector plates or separate connector plates. For example, energy conveying lines carrying instrument air, vacuum, gas, hydraulic fluid, and etc. may be coupled or uncoupled using devices according to the invention.

The matching plates are preferably arranged as a fixed plate mounted on the reactor head and a movable plate attached to a base that is not connected to the reactor head, for example, the cable bridge. When the reactor head is to be opened, the cables are disconnected by uncoupling any locking devices on the matching plates, disengaging the plates, and withdrawing the movable plate. After the movable plate is withdrawn, the cable bridge on which it is mounted may be rotated, normally to the vertical position, to allow sufficient clearance for head removal and refueling operations. It is also within the concept of this invention to mount the movable plate on the reactor head or to use two movable plates in the appropriate circumstances. In all cases, however, the path of each movable plate is precisely controlled by its linkage.

BRIEF DESCRIPTION OF THE DRAWINGS

FIG. 3 is a schematic side elevational view of some other components of the same embodiment.

FIG. 4 is a schematic rear elevational view of a component of the same embodiment.

FIG. 5 is a schematic fragmentary front elevational view of the same component.

FIG. 6 is a schematic side elevational view similar to FIG. 2, illustrating more details of the preferred embodiment and its environment.

DETAILED DESCRIPTION OF THE EMBODIMENTS

Figure 1:
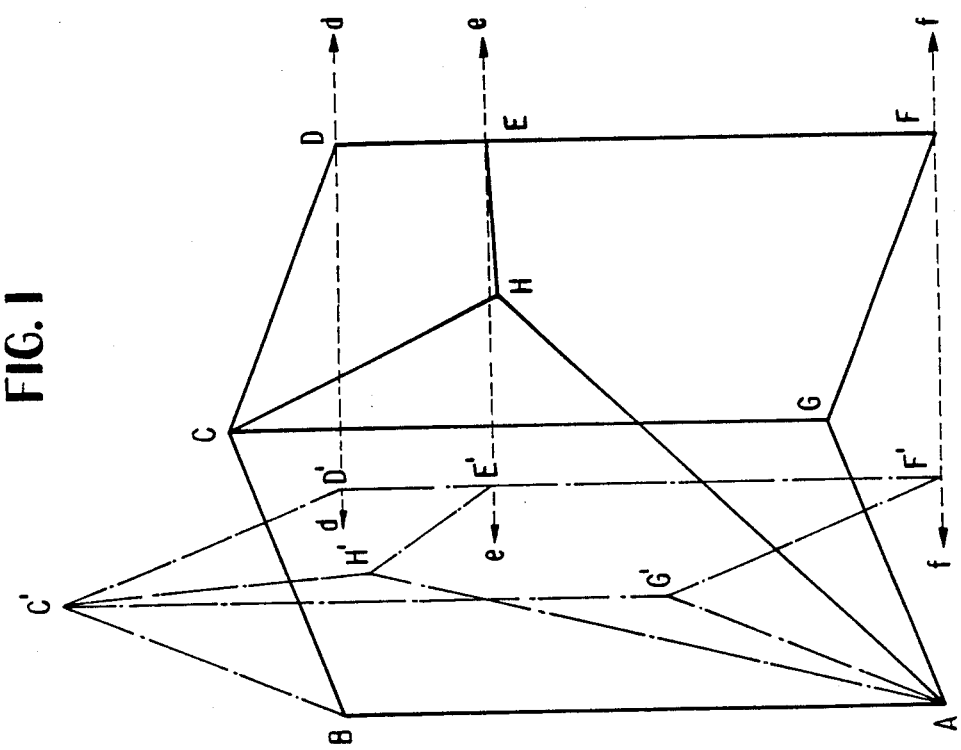
FIG. 1 is a geometrical diagram adapted to be incorporated in the invention.

FIG. 1 illustrates a Kempe's linkage on which the preferred embodiment shown in FIGS. 2 to 6 is based. In the geometrical diagram of FIG. 1, the linkage is shown in its entirety. Conventionally, in the drawing capital letters designate articulated joints and in the description capital letter pairs designate a link or other rigid connective member. Solid lines show the linkage in an extended state, while dash-dot lines illustrate the linkage in its collapsed (retracted) position. The capital letters provided with a prime sign indicate the position of articulations in the retracted position. The members (links or rigid connections) making up the linkage consist of AB, BC, CD, DF, CH, CG, EH, AG, FG and AH; wherein AB=CG=DF=AH, AG=BC=CD=GF=CH, DE=EH and $DF \times ED = CD^2$. Dotted lines dd, ee, and ff show the lines of transition of points D, E, and F, respectively, on the expansion and collapse of the Kempe's linkage, illustrating that the length DF moves in the plane of the drawing in a direction perpendicular to DF and assuming, in the retracted state, the position D'F'.

Figure 2:
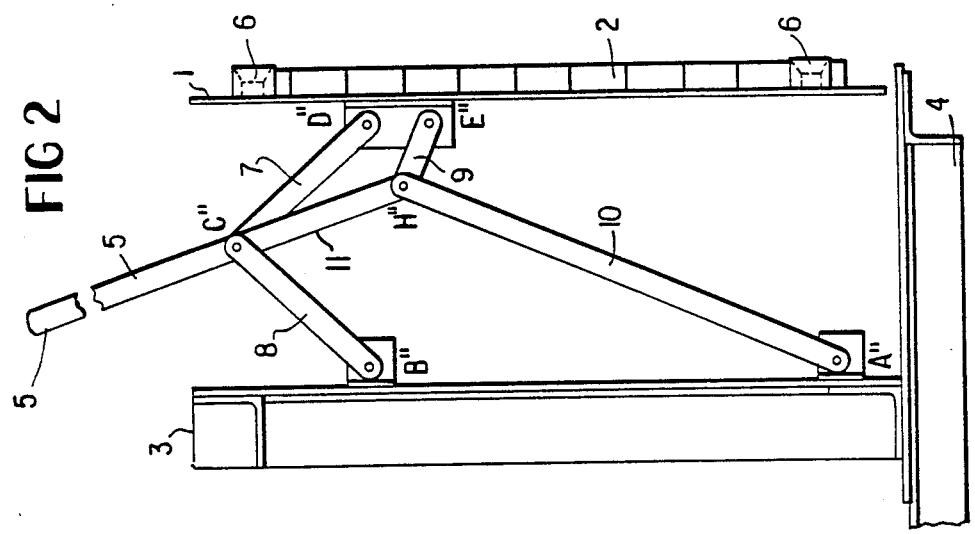
FIG. 2 is a schematic side elevational view of some components of a preferred embodiment.

Turning now to FIGS. 2, 3 and 4, there is shown a preferred embodiment of the invention in which the linkage of FIG. 1 is separated into its component "kite linkage" (BC, CD, CH, EH, and AH) and its component parallelogram linkage (BC, CD, CG, AG, and FG).

Referring particularly to FIGS. 2 and 4, a movable multiple connector plate 1, which contains multiple connectors 2, is attached to a stationary frame 3 by an extendable linkage formed by the kite linkage section of the Kempe's linkage shown in FIG. 1 and comprising links A"H", B"C", C"H", C"D", and E"H". The kite linkage section of FIG. 2 is equivalent to that part of the Kempe's linkage shown in FIG. 1 having the same identifying letters. This linkage is advantageously connected to the movable multiple connector plate 1 along its vertical center line g, as shown in FIG. 4. FIG. 2 also shows a cable bridge 4 on which the stationary frame 3 is mounted. An actuation lever 5, which is an extension of C"H" beyond point C", may be engaged, for example, manually, to exert a clockwise or counterclockwise force to the lever 5 to retract or, respectively, extend the kite linkage. Also shown are aligning means 6 for correctly aligning the movable multiple connector plate 1.

The movement of the movable multiple connector plate 1 is restricted to a predetermined path by links 7, 8, 9, 10, and 11 designated above as C"D", B"C", E"H", A"H" and C"H", respectively, which comprise the kite linkage. Connector plate 1 is attached to stationary frame 3 through links 7 and 8 and through links 9 and 10. Link 7 is connected at one end to the connector plate 1 at pivot point D" and to the end of link 8 at pivot point C". Link 8 is at its other end connected to the stationary frame 3 at pivot point B". Link 9 connects pivot point E" on connector plate 1 with pivot point H", and link 10 connects pivot point H" with stationary frame 3, to which it is connected at pivot point A". Link 11 connects pivot point H" with pivot point C", such that any movement of links 7 and 8 is translated into a related movement in links 9 and 10.

FIG. 3 presents the parallelogram linkage section of the Kempe's linkage. In the described preferred embodiment, the parallelogram linkage is present as a linkage pair, wherein one linkage of the pair is connected to the connector plate 1 along line h, while the other along line i (FIG. 4). As in FIG. 2, FIG. 3 shows the multiple connector plate 1, the connectors 2, the stationary frame 3, the cable bridge 4 and the aligning receptacles 6. Links C'''D''', B'''C''', F'''G''', A'''G''' and C'''G''', which are designated with respective reference numerals 12, 13, 14, 15 and 16, are equivalent to members CD, BC, FG, AG and CG of FIG. 1. While the kite linkage discussed in connection with FIG. 2 and attached to the center line g of the connector plate 1 serves as the driving linkage, the flanking parallelogram linkages function as stabilizers to ensure an accurate, tilt-free displacement of the connector plate 1. Link 12 is connected at one end to plate 1 at pivot point D''', and to link 13 at pivot point C'''. Link 13 connects pivot point C''' with the stationary frame 3 at pivot point B'''. Plate 1 is also connected with stationary frame 3 through links 14 and 15. Link 14 connects to plate 1 at pivot point F''' and to link 15 at pivot point G'''. Link 15 connects pivot point G''' with stationary frame 3 at pivot point A'''. Link 16 connects pivot point C''' with pivot point G''' such that any movement of links 12 and 13 is duplicated in links 14 and 15. As indicated above, one of the linkages of FIG. 3 is connected to the connector plate 1 at points D''' and F''' along line h, while the other linkage is connected to points D'''F''' along line i.

FIG. 5 is an embodiment of the face of a multiple connector plate 1 according to the invention showing the connectors 2. A matching stationary plate having complementary plugs (not shown in FIG. 5) cooperates with plate 1 to complete the connections. Any suitable type of connectors may be used in practice, as long as the connectors can be completely engaged by a movement as guided by the linkage.

FIG. 6 illustrates the preferred embodiment in more detail. It is noted that for the sake of clarity only the kite linkage described in connection with FIG. 2 is shown. Actuator lever 5 is shown as being accessible from a walkway 17 mounted on the cable bridge 4. Also shown is a connector plate 18 which is immovably mounted on the reactor head structure 19 with the movable connector plate 1 for coupling or uncoupling the connectors 2 by virtue of the described displacement of the connector plate 1. The movable connector plate 1 is aligned by the alignment means 20 as it engages the immovably mounted connector plate 18.

While the linkage may be actuated by manual force, the actuation lever 5 may be motor-driven as symbolically shown at 21. The motor 21 may be remotely controlled. Also shown symbolically is a controller 22 for the motor drive 21 which is activated to stop the motor drive when contacts 23 meet to close a circuit signaling that the connectors 2 are fully engaged.

In other embodiments of the invention, different displacing means which provide precisely controlled motion may be substituted for the above described linkage means. Such displacing means may comprise mechanical, electrical, hydraulic, compressed gas, or other power driven displacing means wherein the movement is precisely controlled by tracks, enclosures, or other guide means.

The advantages of the invention include the reduction of worker radiation exposure, reduction of critical path head preparation time, the simplification of coupling and uncoupling operations, the elimination of possible plug and receptacle mismatching, and the reduction of plug and receptacle damage and maintenance requirements.

It will be understood that the above description of the present invention is susceptible to various modifications, changes and adaptations, and the same are intended to be comprehended within the meaning and range of equivalents of the appended claims.

We claim:

1. In a nuclear reactor, a device for connecting a plurality of energy conveying lines to a nuclear reactor head structure comprising:

a pair of matching multiple cooperative connector plates for disengageably connecting an energy source with the reactor head structure; at least one of said connector plates being a movable connector plate; each of the multiple connector plates containing a multiplicity of individual connectors, each individual connector being one of a matching pair of connectors that are engaged when the matching multiple connector plates are brought together, each connector of the matching pair being mounted in corresponding locations on the opposing matching multiple connector plates; and an extendable and retractable linkage means secured to a support structure on one end and to said movable connector plate at the other end and for accurately guiding the movable connector plate along a precise, predetermined path, such that the connectors of each pair of matching connectors meet in correct alignment; said linkage means comprising:

a kite linkage and two separate unitary parallelogram linkages; each of the linkages being separately articulated to the movable connector plate and operating in parallel planes; each said plane being parallel to the direction of motion of the movable connector plate; the kite linkage being articulated to the movable connector plate along a center line thereof, and the two parallelogram linkages being articulated to the movable connector plate adjacent opposite edges thereof disposed on either side of the kite linkage;

the kite linkage comprising first, second, third, fourth and fifth links and first, second, third, fourth, fifth and sixth pivots; the first links being articulated to the movable connector plate at the first pivot thereon and connected to the second link at the second pivot; the second link being connected to the support structure at the third pivot; said first link and said second link being of equal length; the third link being connected to the movable connector plate at a fourth pivot spaced from the first pivot; the third link being connected to and fifth pivot to a fourth link; the fourth link being connected to the support structure at the sixth pivot spaced from the third pivot; the fifth link connecting the fifth pivot point and the second pivot point; the fifth link being extended through the second pivot point to form an actuator arm for extending or collapsing said kite linkage upon applying a force to said arm; the distance between the second pivot and the fifth pivot equalling the length of the first link; the distance between the first pivot and the fourth pivot being equal to the length of the third link; the length of the fourth link being equal to the distance from the third pivot to the sixth pivot; the length of the fourth link multiplied by the length of the third link equalling the square of the length of the first link; and each parallelogram linkage comprising sixth, seventh, eight, ninth and tenth links and seventh, eight, ninth, tenth, eleventh and twelfth pivots; the sixth link being articulated to the movable connector plate at the seventh pivot thereon and to the seventh link at an eighth pivot; the seventh link being connected to the support structure at a ninth pivot; the eighth link being connected to the movable connector plate at a tenth pivot spaced from the seventh pivot and to the ninth link at the eleventh pivot; the ninth link being articulated to the support structure at a twelfth pivot spaced from the ninth pivot; and the tenth link joining the eighth and eleventh pivots; the sixth, seventh, eighth and ninth links being of equal length and of the same length as the first and second links of the kite linkage; the tenth link being of a length equal to the distance between the seventh pivot and the tenth pivot and to the distance between the ninth pivot and the twelfth pivot; the tenth link being equal in length to the fourth link of the kite linkage.

2. The device of claim 1, wherein said matching multiple connector plates comprise aligning means, for aiding said multiple connector plates to be brought into engagement in said correct alignment.

3. The device of claim 1, wherein one of said multiple connector plates is immovably fixed in position.

4. The device of claim 3, wherein the immovably fixed multiple connector plate is mounted on the nuclear reactor head structure.

5. The device of claim 1, further comprising motor means for driving said actuator arm.

6. In a nuclear reactor, a device for connecting a plurality of energy conveying lines to a nuclear reactor head structure comprising:

a pair of matching multiple cooperative connector plates for disengageably connecting an energy source with the reactor head structure; at least one of said connector plates being a movable connector plate; each of the multiple connector plates containing a multiplicity of individual connectors, each individual connector being one of a matching pair of connectors that are engaged when the matching multiple connector plates are brought together, each connector of the matching pair being mounted in corresponding locations on the opposing matching multiple connector plates; and an extendable and retractable linkage means secured to a support structure on one end and to said movable connector plate at the other end, for accurately guiding the movable connector plate along a precise, predetermined path, such that the connectors of each pair of matching connectors meet in correct alignment; said linkage means comprising a central driving linkage and stabilizing linkages flanking said central driving linkage on opposite sides thereof and at a distance therefrom; said central driving linkage and said stabilizing linkages each having opposite ends connected separately to said support structure and said movable connector plate.

7. The device of claim 6, wherein said displacing means includes means for limiting the movement of said movable connector plate to pure translational movement.

8. The device of claim 6, further comprising an actuator means coupled to said central driving linkage for extending and retracting said linkage means.

9. The device of claim 8, further comprising motor means for driving said central driving linkage.

10. The device of claim 8, wherein said actuator means comprises an actuation lever integral with said central driving linkage.

11. The device of claim 6, wherein said matching multiple connector plates comprise aligning means for aiding said multiple connector plates to be brought into engagement in said correct alignment.

12. The device of claim 6, wherein one of said multiple connector plates is immovably fixed in position.

13. The device of claim 12, wherein the immovably fixed multiple connector plate is mounted on the nuclear reactor head structure.

* * * * *